United States Patent [19]

Lucas

[11] 4,220,821
[45] Sep. 2, 1980

[54] OFF-HOOK INITIATED DEMAND ASSIGNMENT COMMUNICATIONS

[75] Inventor: Jerome G. Lucas, McLean, Va.

[73] Assignee: Communications Satellite Corporation, Washington, D.C.

[21] Appl. No.: 916,392

[22] Filed: Jun. 16, 1978

[51] Int. Cl.$^2$ .............................................. H04M 7/16
[52] U.S. Cl. .............................. 370/110; 179/18 BC; 179/18 ES; 455/31; 370/104
[58] Field of Search ........ 179/18 ES, 18 AB, 18 AG, 179/18 AH, 2 EB, 2 E, 15 BY, 18 BB, 18 AD, 18 BC; 325/3, 5, 1, 4, 55, 64

[56] References Cited

U.S. PATENT DOCUMENTS

| | | | |
|---|---|---|---|
| 3,946,315 | 3/1976 | Tustison | 325/55 |
| 4,012,597 | 3/1977 | Lynk, Jr. et al. | 179/2 E |

OTHER PUBLICATIONS

"Demand-assigned Service for the Intelsat Global Network", by Puente and Werth, *IEEE Spectrum*, vol. 8, No. 1, (Jan. 1971), pp. 59-69.

*Primary Examiner*—Thomas W. Brown
*Attorney, Agent, or Firm*—Sughrue, Rothwell, Mion, Zinn and Macpeak

[57] ABSTRACT

Off-hook initiated demand assignment (OHIDA) has particular application in communications satellite systems and provides basic demand assignment trunk service by utilizing an off-hook and on-hook signal processing system to monitor and control terrestrial access circuits. The signal processing system operates under the control of a central processing unit to interrogate each trunk of line. The detection by a signal scanner of an off-hook condition initiates the call processing sequence. Once the trunks between the originating and terminating terrestrial circuit switches are connected via the satellite circuits, the connected trunks are under the control of the circuit switches throughout the address signalling, the message and the call terminating stages. Call complete detection is performed by a signal scanner to detect an on-hook condition so that the satellite circuit may be disconnected.

11 Claims, 24 Drawing Figures

1. SUBSCRIBER OFF-HOOK

2. HOST SWITCH-A RECEIVES DIALED DIGITS & TRANSLATES

3. HOST SWITCH-A SELECTS OUTGOING TRUNK TO B

4. OHIDA SETS UP TRUNK CONNECTION TO B

5. HOST SWITCH-A TRANSMITS CALLING PARTY NUMBER TO HOST SWITCH-B

OFF-HOOK INITIATED DEMAND ASSIGNMENT COMMUNICATIONS

BACKGROUND OF THE INVENTION

The present invention is generally related to a method for providing communications satellite transmission channel assignment on demand, and more specifically, to Off-Hook Initiated Demand Assignment (OHIDA), which eliminates many of the signalling functions and completely eliminates circuit switching functions characteristic of conventional demand assignment.

The need for efficient satellite capacity utilization, flexible traffic routing and channel rate assignment has stimulated various demand assignment satellite systems designs. These demand assignment system designs have utilized subsystems of conventional switching, signalling and circuit interface subsystems to provide the basic transmission services.

Basic trunk service between two conventional circuit switches or Private Branch Exchange (PBX) switching systems is illustrated in FIG. 1A of the drawings. Conventional demand assignment, employing two switching systems and three complete trunks is illustrated in FIG. 1B. As shown in FIG. 1B, the basic trunk service requirement is provided by means of intermediary circuit switching systems. These switches and associated terrestrial signalling and interface control facilities are embodied in the satellite modulation and access system design.

In order to provide basic trunk service with conventional demand assignment, the following signalling and switching action must occur for a successfully completed call or trunk connection:

(1) Call supervision and address signalling must be forwarded to the terminating earth station system by the originating terrestrial switch or terminal.

(2) A circuit switch connection must be made to a satellite trunk, if available, and call address and supervision must be passed forward to the terminating earth station.

(3) Finally, call supervision and address signalling must be forwarded to the terminating terrestrial switch or terminal.

The complexity, cost and reduced service quality associated with the three trunk and two switch conventional demand assignment design are the disadvantages of this system. These disadvantages can be highlighted in more detail by examining the various associated subsystems.

The minimum subsystem requirement, less transmission carrier plant, for 4-wire trunk service between two PBX systems is illustrated in FIG. 2. This figure illustrates the PBX systems, the 2-wire circuits and the associated control leads connected to the Main Distribution Frame (MDF). The MDF houses the trunk signalling sets. Finally, the dedicated 4-wire trunk itself is illustrated.

The disadvantages of providing this basic transmission data with conventional satellite circuit demand assignment can be best appreciated by comparing FIG. 2 with FIG. 3. The additional requirements per earth station in FIG. 3 are the Line Signal Frame (LSF), switching network, and service circuit group (e.g., tone trunks, digit receivers and transmitters, and Computer Processor Unit (CPU) control interface). These units comprise what is referred to as the Satellite Communications Controller (SCC)—i.e., the subsystem between the terrestrial access lines and the satellite RF carrier system. The modulation/access unit and the earth station RF equipment are, of course, part of the transmission carrier system. This system, or its equivalent, would be required for the basic point-to-point carrier services as illustrated in FIG. 2.

The disadvantages of requiring these additional subsystems may be summarized as follows: the switching requirement adds significant delay in establishing a trunk connection between called and calling terrestrial switches and/or terminals. The dedicated satellite and terrestrial switches must exchange, under established protocol, supervisory and address signalling in three sequential stages. Since the called party signalling address is required by the satellite system switches for call routing from the originating to terminating earth station, the additional processing time required to receive, process and transmit the calling party message increases trunk or call set-up time.

Another disadvantage of the conventional demand assignment is the associated cost of the SCC. The cost of the intermediary switching networks and the service circuits, e.g., digit receivers, transmitters and tone generating circuits, required to support call processing is significant. Finally, the complexity of the SCC increases the size of the modulation and access CPU requirements, increases the volume of computer data processes, increases the operations and maintenance costs and decreases system reliability and availability.

SUMMARY OF THE INVENTION

It is therefore an object of the present invention to provide satellite channels on demand with a fastener satellite system trunk set-up time, but without the use of intermediary switching and signalling facilities and without the need for intercepting and processing the called telecommunication terminal address number or signalling address code.

According to the present invention, incoming trunks from the host switch, e.g., the MDF in FIG. 4, are each dedicated to a particular destination so that the SCC need not intercept the supervisory and address signalling in order to determine the destination of the call. Thus, OHIDA eliminates many of the signalling functions and completely eliminates circuit switching functions associated with conventional demand assignment. The conceptual differences between conventional demand assignment and OHIDA, according to the present invention, may be seen by comparing FIGS. 1B and 1C. OHIDA provides basic trunk service by utilizing the internal features of the invention to coordinate terrestrial and satellite circuit paths without the use of circuit switching as illustrated in FIG. 1C. The advantages of OHIDA according to the invention over conventional demand assignment designs are best illustrated by comparing FIGS. 3 and 4. OHIDA does not require a circuit switching network or service circuits to support call processing. OHIDA does not intercept or store the address and supervisory signals that are transmitted by the terrestrial switches. Thus, the SCC design and operation is greatly simplified, and the disadvantages of conventional demand assignment associated with the function requirements of these subsystems are not characteristics of OHIDA.

Finally, the trunk set-up time performance advantage of OHIDA can be delineated by the following considerations. The transmission trunk provided by OHIDA is transparent to address and supervisory signalling during the processing of a call between two terrestrial switches after the initial off-hook signal. Therefore, the signalling sequence and timing between two PBX systems would be identical in FIGS. 2 and 4. The trunk set-up time delay factor, associated with signal interception and processing, is not present in the OHIDA system. The quality of service to the end user is, therefore, enhanced by the reduced post-dialing delay. The satellite capacity utilization is also increased because of reduced holding time per call on the satellite circuit.

BRIEF DESCRIPTION OF THE DRAWINGS

The foregoing and other advantages of the invention will clearly appear from the following description with reference to the accompanying drawings, in which.

DESCRIPTION OF THE PREFERRED EMBODIMENTS

The OHIDA technique is a fast and simple technique for providing satellite circuits on a demand assigned basis. Off-hook is defined as the condition that exists when a call is originated and exists until disconnect. With the OHIDA technique, a unique destination is associated with a set of incoming SCC ports. This set of ports is referred to as the directionalized ports, and all that is required to route a directionalized call is an off-hook signal from a terrestrial switch or terminal. There may also be ports which do not have this one-to-one correspondence and are referred to as non-directionalized ports. The routing of non-directionalized calls will be discussed in more detail at a later time.

Figure 1A:
FIGS. 1A, 1B and 1C illustrate the basic trunk requirement versus demand assignment concepts for basic trunk service, conventional demand assignment and OHIDA, respectively.
Figure 1B:
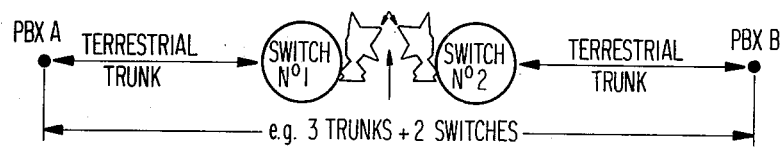
Figure 1C:
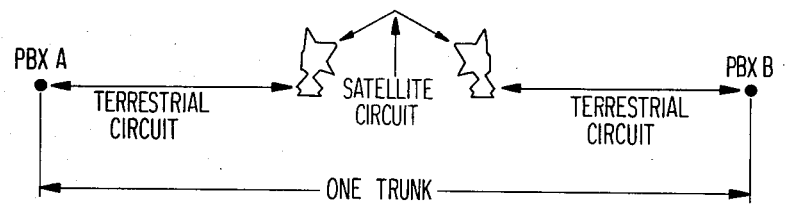
Figure 2:
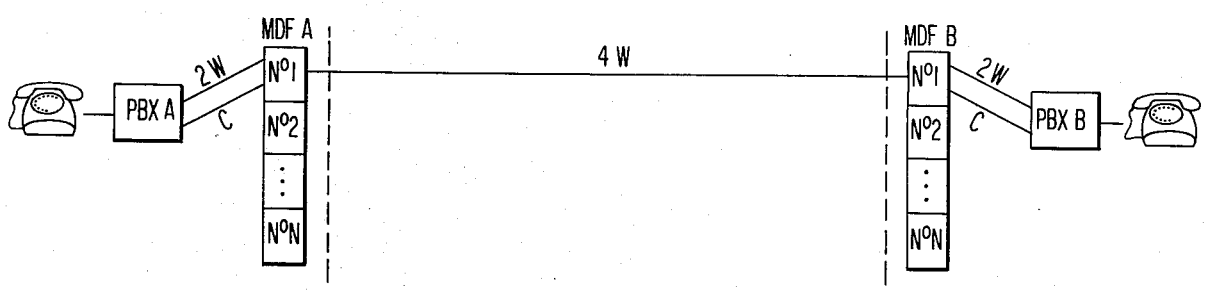
FIG. 2 is a block diagram illustrating the basic carrier service subsystems.
Figure 3:
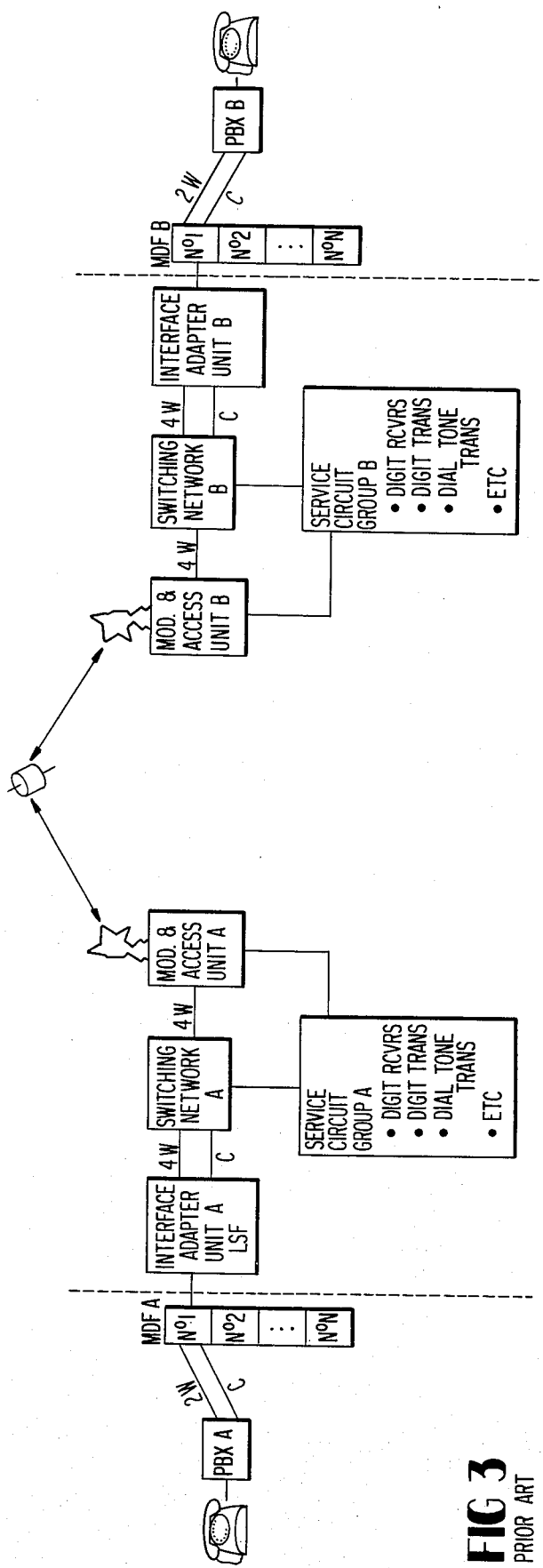
FIG. 3 is a block diagram illustrating conventional demand assignment subsystems.
Figure 4:
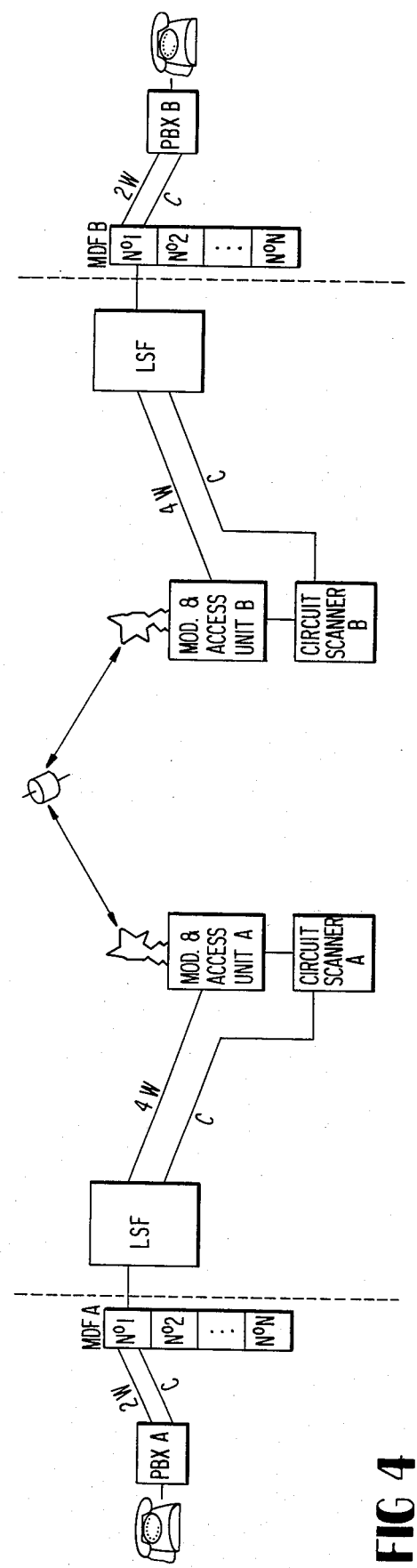
FIG. 4 is a block diagram illustrating OHIDA subsystems.
Figure 5:
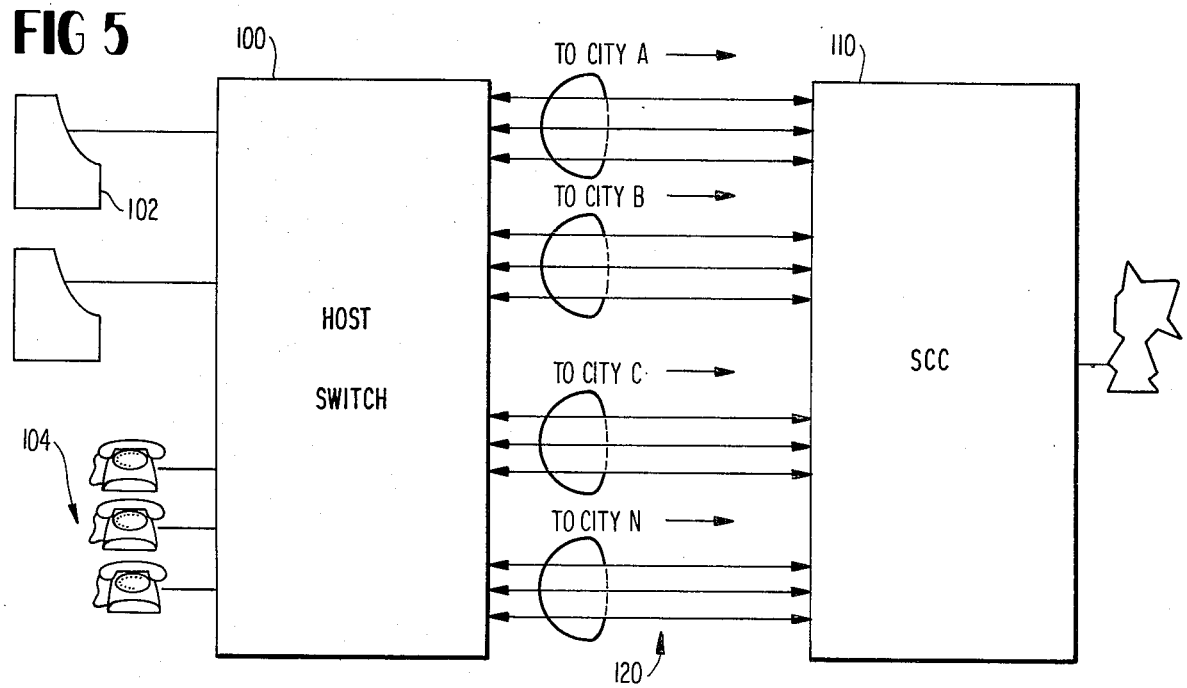
FIG. 5 is a general block diagram illustrating the concept of the OHIDA system.

The OHIDA concept can be better understood by referring to FIG. 5. A terrestrial host switch 100, which may be either the PBX or MDF illustrated in FIG. 4, is connected to an SCC 110 by a plurality of trunks 120. The trunks 120 illustrated in FIG. 5 are "directionalized." This means that each of the trunks 120 is dedicated to a particular terminating SCC. The host switch 100, upon receiving an outgoing call (from either a PBX 102 or a subscriber telephone 104) destined for a far-end host switch via a far-end SCC, selects an outgoing trunk that will "direct" the SCC 110 to the desired far-end (or called) SCC. Since each of the trunks 120 is dedicated to a particular destination, the originating SCC 110 knows when and where to route the call based solely on the off-hook signal it sees when a particular trunk is selected. The particular destination is determined by the SCC 110 which includes a look-up table providing a unique SCC destination for every originating "directionalized" circuit. Since the trunks are dedicated, there is no need for the calling SCC to intercept address signalling, and, instead, the address signalling is passed directly from the calling to the called host switch. This will be more clearly understood by referring to FIGS. 6(a)-6(e).

Figure 6A:
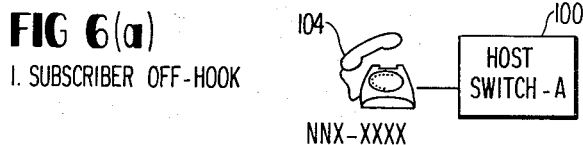
FIGS. 6(a)-6(e) illustrative successive steps in the set-up of a call by the OHIDA system according to the present invention.
Figure 6B:
Figure 6C:
Figure 6D:
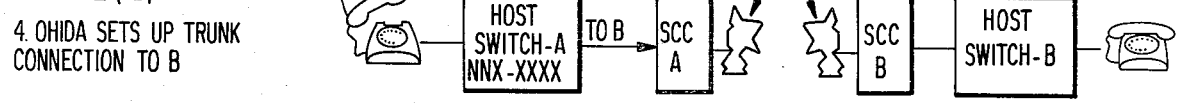
Figure 6E:
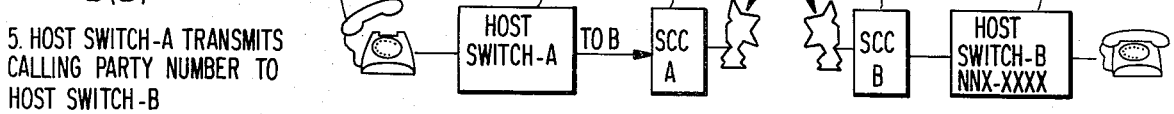

FIGS. 6(a)-6(e) illustrate the OHIDA system for directionalized calls. The customer dialing sequence can be broken down into five parts. First, as shown in FIG. 6(a), the customer 104 goes off-hook and transmits his digits (NNX-XXXX) to the originating host switch 100. Second, as shown in FIG. 6(b), the host switch 100 receives the dialed digits from the subscriber (or from another switch if host switch 100 is functioning as a tandem switch). Third, as shown in FIG. 6(c), host switch 100 selects an outgoing trunk from the set or group identified by NNX and generates an off-hook signal on the selected trunk dedicated to the called switch. Fourth, as shown in FIG. 6(d), the SCC 110 detects the off-hook signal on one of its incoming trunks, determines the called switch 101 via a computer-stored translation table and selects a satellite trunk on demand from the pool of available trunks. In the final sequence, shown in FIG. 6(e), the called host switch 101 sends an acknowledgement signal to the calling host switch 100 which, upon detecting the acknowledgement, transmits the called number (NNX-XXXX) directly to host switch 101. The host switch 101 determines from the dialing sequence which of its subscribers is to receive the call. The off-hook trunk signalling is preferably accomplished according to conventional E and M signalling. A simple understanding of E and M signalling can be obtained by reference to FIGS. 7 and 8.

Figure 7:
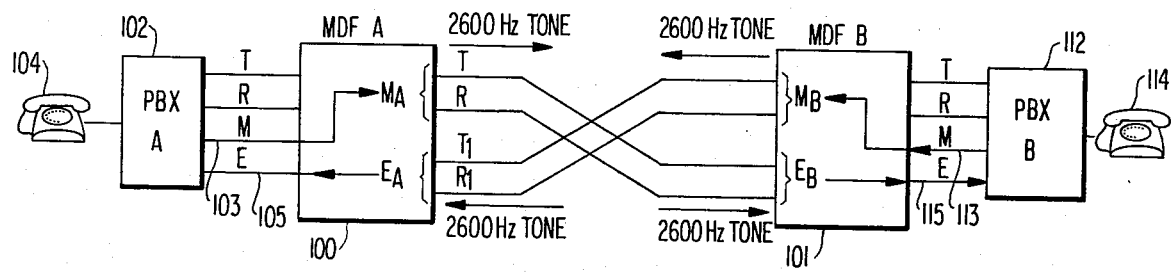
FIG. 7 and 8 are block diagrams illustrating the tone signals associated with on-hook and off-hook conditions.
Figure 8:
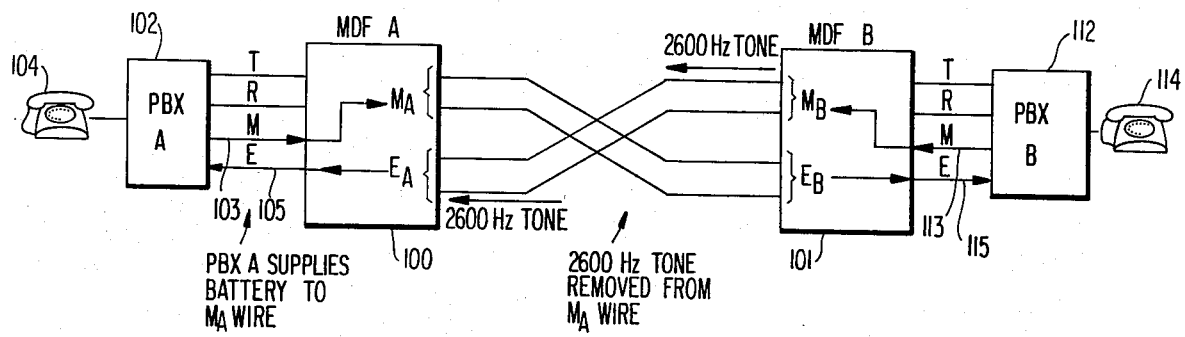

FIGS. 7 and 8 are illustrations of the tone signals associated with on-hook and off-hook conditions, respectively. For an idle trunk as illustrated in FIG. 7, M lead 103 is at ground potential, and a single frequency in-band signalling tone is transmitted on lines $M_A$ and $M_B$ by the signalling sets located in the MDFs 100 and 101. The tone of 2600 Hz is considered standard for 4-wire Signal Frequency (SF) signalling in the United States and elsewhere. It is to be noted, however, that this is not meant to imply that the OHIDA system, according to the present invention, is restricted to this particular frequency, nor, in fact, is the OHIDA system restricted to one signalling frequency per trunk.

When a trunk is seized by the PBX 102, the M wire 103 is changed from ground to a DC potential, as shown in FIG. 8. A relay (not illustrated) then operates from the potential on the M wire to remove the 2600 Hz tone from the $M_A$ lines in MDF 100. The loss of the tone is detected by a tone detector in MDF 101 by the absence of the tone at the $E_A$ lines, and the tone detection equipment reacts by placing E wire 115 at ground. The correspondence between E and M lead conditions and the trunk states is shown in the following Table 1.

TABLE 1

| | Originating Office | | | Terminating Office | | |
|---|---|---|---|---|---|---|
| Calling Subscriber or Trunk State | E Lead (105) | M Lead (103) | Direction of Transmitted Signal | E Lead (115) | M Lead (113) | Called Subscriber State |
| Trunk Idle | Open | Ground | (none) | Open | Ground | On-Hook |
| Trunk Seized | Open | Battery | | Ground | Ground | On-Hook |
| Off-Hook (Conversation Period) | Ground | Battery | | Ground | Battery | Off-Hook |
| On-Hook (Calling Subscriber Disconnects) | Ground | Ground | | Open | Battery | Off-Hook |
| Trunk (Disconnected) | Open | Ground | (none) | Open | Ground | On-Hook |

| SCC DESIGNATED E AND M LEAD STATE VALUES | | |
|---|---|---|
| Lead | D.C. Potential | State Value |
| E | Open | 0 |
| E | Ground | 1 |
| M | Ground | 0 |
| M | Battery | 1 |

With the requirements of FIGS. 5-8 as background, the OHIDA system will be more clearly explained with reference to FIGS. 9-12.

Figure 9:
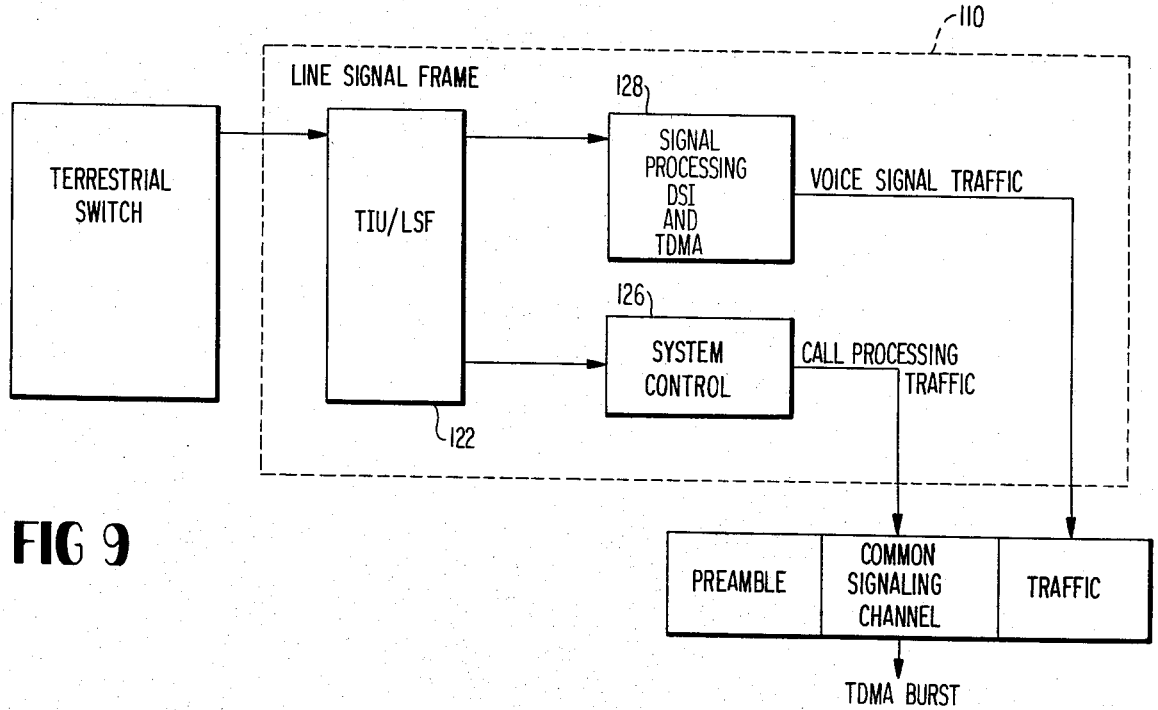
FIG. 9 is a block diagram of the various subsystems within each SCC.

The SCC requirements for the OHIDA system are illustrated in FIG. 9. The SCC 110 includes a Terrestrial Interface Unit (TIU) 122 which receives the supervisory—i.e., tone signalling, called number, etc.—and voice signal information from a terrestrial switch 100, which may be a PBX or MDF, and separates the supervisory information from the voice signal information. For most applications, the TIU comprises only a conventional Line Signal Frame (LSF). However, certain modifications may be made, as will be explained at a later point in this specification. Signalling supervision passes to a system control 126, and the voice signal information passes to a signal processing subsystem 128 which typically performs the analog-to-digital (A/D) conversion and perhaps Digital Speech Interpolation (DSI). The system control 126 includes a microprocessor that directs Time Division Multiple Access (TDMA) common control—i.e., TDMA buffering, clocking, frame counting, etc.—and OHIDA call processing functions. The TDMA functions performed by the system control are well known and will not be discussed in detail here. The call processing functions include scanning terrestrial lines for call originations (i.e., off-hook originations) and disconnects, routing calls once an on-hook signal is detected and formulating the call set-up messages associated with the demand assigned channel. The call set-up message is sent to the called or terminating SCC over a Common Signalling Channel (CSC) in each TDMA burst while the voice signal information is sent over a separate traffic channel in the burst.

Figure 10:
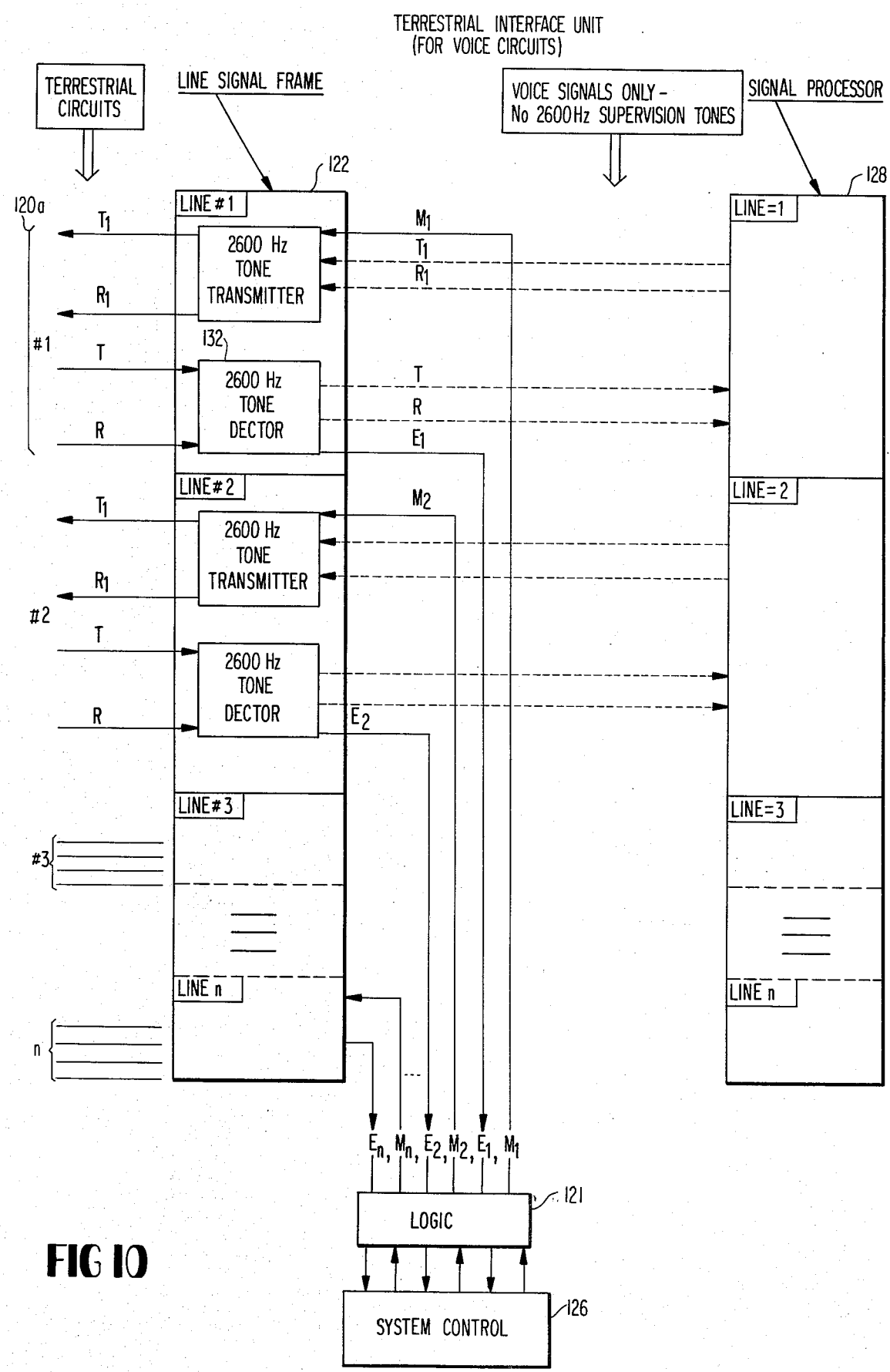
FIG. 10 is a block diagram illustrating in more detail the TIU, signal processor and system control of FIG. 9.

As shown in FIG. 10, the TIU 122 comprises a LSF. The LSF is a standard group of E and M line signalling sets located at the distribution frame, or host switch. The 4-wire voice signal circuit for each trunk is supplied to the signal processor 128 while the supervisory E and M leads are supplied to the system control 126. When trunk 120a is idle, a tone is detected by tone detector 132 and a discrete DC signal indicative of the detected tone is supplied via lead $E_1$ to the system control 126 through logic circuitry 121. When the trunk 120a is idle, a tone is detected by tone detector 132 and a discrete DC signal indicative of the detected tone is supplied via lead $E_1$ to the logic circuitry 121. When the trunk 120a is seized, no tone is detected by the tone detector 132, and, consequently, a discrete DC signal indicative of the absence of a tone is supplied via line $E_1$ to the logic circuitry 121. The $M_n$ leads from the logic circuitry 121 to the tone transmitters indicate the E lead states from the called SCCs, and thus, no relationship exists between the E and M leads until the calling terrestrial switch goes off-hook.

In logic circuitry 121, the E lead potentials are converted to binary form, and the received M lead signals are converted to DC potentials according to Table 1 above. The E lead states are then transmitted over the CSC to the terminating SCC. The system control 126 updates the transmitted E lead binary values every 5 ms, which is the TDMA frame duration. When a called SCC receives an off-hook signal, an acknowledgement signal is returned over the CSC and a satellite circuit is immediately established.

Figure 11:
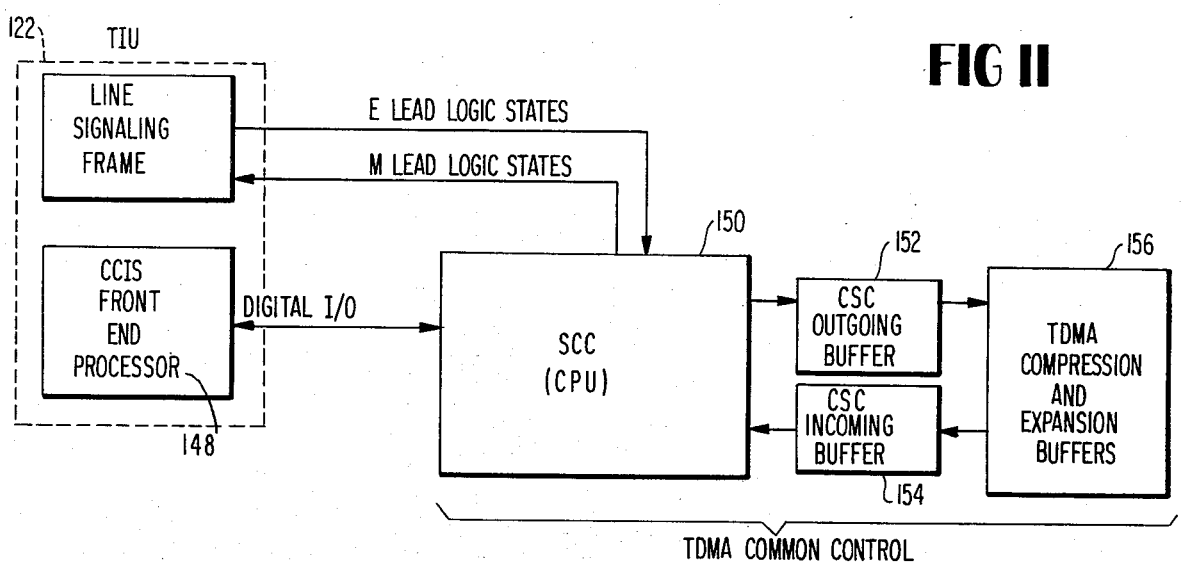
FIG. 11 is a block diagram illustrating the functions performed by the central processor unit of the system control.

As described above, the system control 126 of FIG. 9 includes a processor which directs TDMA common control and call processing functions. FIG. 11 is a block diagram of the system control showing the CPU 150, CSC outgoing and incoming buffers 152 and 154, respectively, and TDMA compression and expansion buffers 156. The operation of these components are well understood in the art, and will not be described in detail here. The optimal Common Channel Interoffice Signalling (CCIS) front-end processor 150 included in the TIU will be discussed hereinbelow. The CPU 150 of system control 126 is a conventional processor, e.g., Motorola microprocessor chip M6800 described in *Microprocessors: Technology, Architecture and Applications,* edited by McGlynn, John Wiley & Sons (1976).

The CSC is used to provide inter-earth station control and performs out-of-band supervision, call set-up, call disconnect, acknowledgements and burst slot redirection. The CSC is used to transmit between originating and terminating SCCs and the information to be transmitted over the CSC during OHIDA operaton is as follows.

For out-of-band supervision, the E lead states are sensed via the TIU 122 and logic circuitry 121, and their states are transmitted to the far-end host switch when an off-hook state is detected. Received M lead states update a call map in the system control and are provided to the LSF for tone generation. During call set-up, the SCC, via a system control CPU, provides the terminating SCC with the receive port information that is required in the latter's call address map, e.g., it must advise the terminating SCC of the particular trunk which has been seized at the originating SCC so that the terminating SCC may determine the called switch from its address map. For non-directionalized calls, the CSC is used to address a reference SCC, as will be discussed in more detail below. For call-disconnect, the SCC can sense the E and M lead states via its system control and thereby terminate calls upon request. Upon termination, the call burst position must be released and the disconnecting SCC must communicate the burst position release over the CSC. During transmit, the CSC must provide acknowledgements of call set-up via out-of-band signalling and all received acknowledgements are routed to the CPU. No burst slot redirection—i.e., reassignment of burst slot location—is performed by the CSC during transmit. However, burst slot assignments for some pooled, or non-directionalized calls, are transmitted over the CSC. This will be discussed in more detail below.

The CSC is a fixed data rate channel, e.g., 4 symbols, 8 bits and 5 ms, or 1.6 kbps. CSC messages are formatted in a burst over the TDMA channel in a burst-by-burst fashion. Each of the five types of CSC messages are transmitted in block form, indicating the message address, message type and message information field. Most messages will not fit into the slot allowed per frame, and thus, several frames (transmitted every 5 ms) will be required.

For call processing, the system control must perform map management and scanner control. These functions will be described with reference to Tables 2 and 3 below.

TABLE 2

| Near End SCC Port Number | Terrestrial Line State Incoming (E Lead) | TDMA Burst Assignment State | Near End Terminating SCC Routing | Far End Terminating SCC Routing Demand Assigned | Far End SCC Port Number | Terrestrial Line State Outgoing (M Lead) |
|---|---|---|---|---|---|---|
| 1 | 0/1 | 0/1 | SCC #1 | SCC #K | k | 0/1 |
| 2 | 0/1 | 0/1 | SCC #1 | SCC #J | j | 0/1 |
| 3 | 0/1 | 0/1 | SCC #2 | SCC #K | k | 0/1 |
| n-1 | 0/1 | 0/1 | SCC #N | SCC #L | l | 0/1 |
| n | 0/1 | 0/1 | SCC #N | SCC #L | l | 0/1 |
| | Hardwired | Software | Hardwired | Software Assigned | | Software Assigned |

TABLE 3

| 1. Terrestrial Line State (E Lead) Status (0/1) | 2. TDMA Burst Assignment Status (0/1) | 3. Condition | 4. Scanner Action | 5. SCC Action |
|---|---|---|---|---|
| 0 | 0 | Trunk On-Hook, No Burst Assigned | None | None |
| 1 | 0 | Trunk Off-Hook, No Burst Assigned | Flag | Trunk Connect Timing |
| 0 | 1 | Trunk On-Hook, Burst Assigned | Flag | Trunk Disconnect Timing |
| 1 | 1 | Trunk Off-Hook, Burst Assigned | None | None |

The SCC call processing map in system control is the heart of the call processing function. This map is generated by "hard-wired" input ports and by "software assigned" task programs. The call processing map is illustrated in Table 2. Table 2 contains seven columns and n rows. The columns are associated with terrestrial line supervision, TDMA burst slot assignment and destination SCC routing and assignment, while the rows correspond to the total number of voice, data or conference ports. Column 1 is a listing of the originating SCC port numbers. The remaining six columns are the states associated with this port, and the terminating SCC port to which it may be connected.

The terrestrial line states are set by the E lead potential indicated by the logic circuitry 121 and are illustrated in column 2. The map has recorded a "numeral 1" for an off-hook state and a "numeral 0" for an on-hook state. These states are provided by hard-wiring to the DC/logic state converter 121 in a well-known manner, and these values are transmitted on the CSC up-link burst. The M lead states received from the called switch and outgoing from the originating SCC to the calling terrestrial switch are given in column 7 of Table 2. These states can be obtained from the CSC link by software. The TDMA burst slot assignment states are shown in column 3. These assignments are made by the call processing software after an off-hook signal is detected by a call processor scanner, described hereinbelow. This field can also be used to determine if a new call can be processed. The total number of available burst slots, less the sum of column 3, is a measure to determine the available capacity for new calls. It should be noted that these assignment states are 1 whenever the connection is held up, even though the E lead indicates a temporary 0.

The near-end terminating SCC routing map is shown in column 4. That is, the near end SCC looks at this map to determine the proper destination for calls at a particular port. For example, any calls detected at ports 1 and 2 will be routed to SCC #1, whereas calls at ports (n-1) and n will be routed to SCC #N. This map is used in the OHIDA technique to associate a call origination with a terminating trunk. It can be updated or changed by replacing the ROM in which it is stored. The far-end terminating SCC I.D. numbers which are demand assigned are shown in column 5. Note that an SCC is associated with every port for an incoming off-hook initiated call from column 2. These connections may be software assigned. Column 6 of Table 2 is the far-end SCC port number associated with the far-end terminating SCC. This information indicates the port-to-port connection—i.e., it indicates the particular outgoing port from the terminating SCC to the called switch which is dedicated to the originating SCC port at which the off-hook signal was detected.

The scanning of incoming terrestrial lines is done in software. Once the supervisory information is transmitted from the TIU and recorded in the SCC call processing map as shown in column 1 of Table 2, the scan information can be updated. The terrestrial on/off-hook states of column 2 can be compared with the TDMA burst slot assignment of column 3 to determine when a change in state has occurred which will require some system action.

In order to provide a better understanding of the call processing scanner, columns 2 and 3 of Table 2 have been repeated in columns 1 and 2, respectively, of Table 3. Table 3 also includes, in column 3, an explanation of the terrestrial line state condition, in column 4 the action taken by the scanner, and in column 5 the SCC call processor action. When no E lead off-hook signal is present, no TDMA burst slot is assigned. When an off-hook E lead signal is detected, the scanner notes the change in state, and the SCC begins timing to determine if it is a true off-hook signal. A disconnect state occurs when an on-hook signal is present on a terrestrial line and a TDMA burst slot has been assigned. Again, the change in state is detected by the scanner and timing is begun to determine if it is a true disconnect. When an off-hook E lead state is indicated and a corresponding TDMA burst slot has been assigned, a call is in progress and no further action is taken. The software programming required to perform the scanner control and map management as described would be a simple exercise to one of ordinary skill in the art, given Tables 2 and 3, and, therefore, will not be further discussed.

The call processing of a directionalized OHIDA call is summarized in Table 4. The left-most column of Table 4 indicates which of FIGS. 6(a)-6(e) corresponds to the described step.

TABLE 4

| I. SYSTEM STEPS | II. SCC SUBSYSTEM ACTIONS | III. INTRA SCC SUBSYSTEM INFORMATION TRANSFER | IV. INTER SCC/HOST SWITCH INFORMATION TRANSFER |
|---|---|---|---|
| | (Symbols Identified At End of Table) | | |
| 1. Suscriber off-hook | — | — | — |
| 2. Host switch translates | — | — | — |
| 3. Host switch A selects outgoing trunk to host switch B | a. SC scans terrestrial line states in its software | TIU passes line state information to SC | Off-hook on incoming line at SCC A |
| | b. SC compares previous state with present state and finds an off-hook has occurred | — | — |
| | c. SC looks up line appearance in translation table and determines called SCC host switch | — | |
| | d. SC selects satellite channel burst slot from its pool (e.g., its own reserved slot) | — | — |
| 4. Satellite circuit setup, SCC A & B | a. SC formulates inter ES signalling message to go over CSC | — | — |
| | b. SC loads CSC buffer for transfer to TDMA buffers | SC directs TDMA common control to transmit CSC message | — |
| | c. TDMA common control orchestrates CSC message transmission to called SCC (B) | — | — |
| | d. TDMA buffers receive ACK from called SCC (B) | TDMA common control directs received CSC | — |
| | e. SC determines when locally supplied M lead signal control is to be replaced by called end signal control | — | — |
| 5. Host switch receives off-hook ACK on outgoing trunk | a. SCC A connects out-of-band signalling channel to M lead indicator | CSC sends lines supervision state to TIU | Host switch receives signalling control information from called switch |
| 6. Host switch transmits trunk supervision and address signalling to called switch | a. If DP signalling, the sequence of off-hook and on-hooks are carried over the CSC and are repeated at the called end or If touch-tone signalling, the tones are passed | E & M lead states are exchanged | Host switch (A) transmits address signalling to called switch (B) |

TABLE 4-continued

| I. SYSTEM STEPS | II. SCC SUBSYSTEM ACTIONS | III. INTRA SCC SUBSYSTEM INFORMATION TRANSFER | IV. INTER SCC/HOST SWITCH INFORMATION TRANSFER |
|---|---|---|---|
| | in-band | | |

Figure 12A:
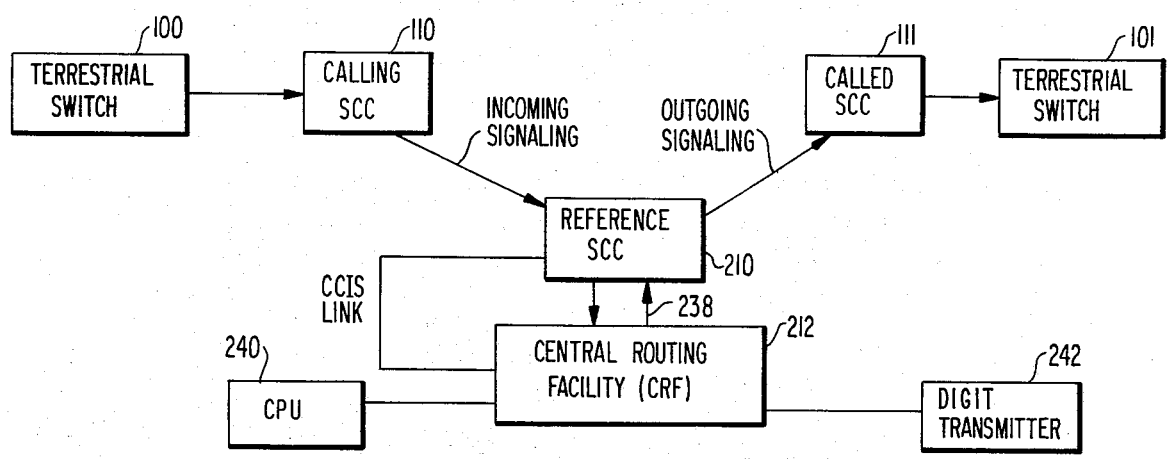
FIGS. 12(a) and 12(b) are block diagrams illustrating the processing of non-directionalized calls according to the OHIDA technique.
Figure 12B:
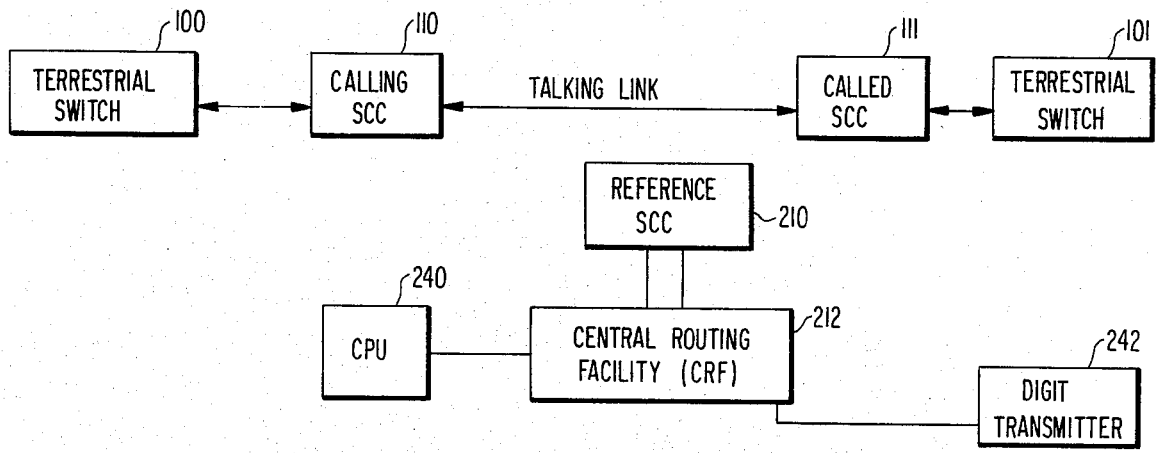

No. 2 SCC Symbols
TIU - Terrestrial Interface Unit
SC - System Control
ES - Earth Station
CSC - Common Signalling Channel
ACK - (Message) Acknowledgement The OHIDA technique can also be used to assign satellite circuits on demand to another category of calls. These are incoming calls on terrestrial circuits for which there is not a unique one-to-one correspondence with originating trunk and terminating SCC. This case occurs, for example, when the traffic to a number of terminating SCCs is small. In such a case, there are traffic efficiencies which may be achieved by pooling these trunk groups or routes together into one. The case in which several SCCs can be accessed by a trunk or trunk group is called non-directionalized demand assignment, and the processing of such calls by the OHIDA system is illustrated in FIGS. 12(a) and 12(b).

For non-directionalized demand assignment, a reference SCC 210 is required to relay the call, and a Central Routing Facility (CRF) 212 is required to intercept the called party's digits, supervise the call set-up, perform translation (e.g., determine the called SCC) and outpulse the dialed digits to the called terrestrial switch. The CRF is located at the reference SCC site. The CRF 212 is a conventional switch and is equipped with Common Channel Interoffice Signalling (CCIS) for information transfer with the reference SCC. One switch suitable for use as the CRF 121 is the DTS-1075 available from Collins Radio.

CCIS is a method of transmitting signalling supervision and address information out-of-band. The Bell System has developed message formats for this data link and has begun to use this signalling mode between their modern terrestrial switches in place of conventional signalling methods (Touch-Tone, dial pulse, etc.). CCIS is described in the Bell System Notes on DDD (1975), Chapter 6. CCIS was chosen for the reference SCC-to-CRF link because the CRF is expected to be an "off-the-shelf" stored program switch which is CCIS compatible. It should be understood, therefore, that other signalling modes could be used as well in the OHIDA system.

As mentioned above, an optional CCIS front-end processor may be included in the TIU 122 of FIG. 11. The CCIS processor 148 can be included in order to provide an alternative call processing mode. The terrestrial switch would pass the supervisory and address signalling directly into the SCC over a CCIS data link, and the SCC would translate the called party number and either would pass the supervisory and address signalling directly to the called SCC over the CSC link if the called terrestrial switch were CCIS compatible, or would pass them to the CRF if the called switch were not CCIS compatible. In this latter case, the CRF would process the call as a non-directionalized call.

The TDMA common control includes a CPU 150, CSC outgoing and incoming buffers 152 and 154, respectively, and TDMA compression and expansion buffers 156.

The call processing sequence for a non-directionalized call is as follows. The calling terrestrial switch 100 selects an outgoing trunk to the originating SCC 110 based on the NNX code of the called party number. This outgoing trunk happens to be a non-directionalized trunk. The originating SCC 110 processes this call, utilizing the OHIDA technique as described above—i.e., it directs the call to a reference SCC 210 to which the selected trunk is dedicated. A satillite channel is set up between the originating SCC 110 and the reference SCC 210 and CRF 212. The CRF then receives the called party number NNX-XXXX from the reference SCC via conventional access lines 238 and stores that number in its CPU 240. Note that if the incoming call were immediate dial pulse, the address information is transmitted instantaneously over the CSC link to the CRF. On the other hand, if tone signalling is used, the CRF returns conventional-type signalling acknowledgements before receiving the address information. After receiving and storing the called party number, the terminating SCC I.D., e.g., from column 4 of Table 2, is passed over the CCIS link to the reference SCC 210, which is thereby enabled to set up a link to the terminating SCC in the manner described above. If the call cannot be completed, the CRF terminates the call with a conventional overflow tone circuit connection which is sent back to the calling switch 100 via SCCs 210 and 110.

If the call can be completed, the CRF moves the called party digit sequence from its CPU 240 to an appropriate digit transmitter 242, and, at this time, a second burst position is selected at the reference SCC 210 for transmission to the terminating SCC 111. The dialed digits are transmitted to SCC 111, at which time the digit transmitter is dropped at the CRF 212. This triggers the CRF to send a call complete message over the CCIS link to the reference SCC, and the reference SCC and CRF then drop out of the call link, as illustrated in FIG. 12(b).

The typical SCC will have a mix of directionalized and non-directionalized trunk groups. Analysis has shown that typically four directionalized trunk groups can process roughly 80% of the traffic at an SCC. The remaining 20% will be non-directionalized to any earth station and will be processed under CRF control. Both the directionalized and non-directionalized trunks are processed with the OHIDA technique—i.e., no additional hardware is required. Both types of calls are assigned a satellite channel based on terrestrial switch off-hook signals. In addition, both of the above processing cases do not require the interception of address signalling by the originating or terminating SCCs. The difference between the two cases is that the non-directionalized call makes use of a reference SCC 210 as both an originating and terminating SCC, and the CRF 212 as both a "called" switch and a "calling" switch used to establish the communications link, so that a control message over the CSC is required to change the call routing maps in both the originating and terminating SCCs upon completion of call signalling.

Disconnect Processing

Disconnect processing tasks associated with OHIDA directionalized and non-directionalized control signalling are identical. However, distinction has to be made as to whether the initial disconnect signal occurred at the near end or far end. In the case of a near-end disconnect, the circuit scanner detects on-hook disconnect signals, and this information is processed by the system control. The disconnect signal is timed in order to insure against false indications, subscriber flash signals, etc. When it has been determined that a true disconnect has occurred, system control updates its traffic management data base, e.g., the call map of Table 2, and prepares a call disconnect message for the called earth station. In the case of a far-end disconnect, the disconnect signal is received over the satellite CSC, and the SCC, upon detecting the disconnect signal in its incoming CSC message buffer, directs the line signalling frame to provide an on-hook signal to the specified terrestrial trunk. System control then updates its traffic management data base.

Incompleted Call Processing

A complete call in the OHIDA system occurs when the satellite circuit between the calling and called terrestrial switches is established. There are numerous events and circumstances which can occur to cause a call not to be completed.

If a failure or a sustained outage occurs in the originating earth station, the host switch must be informed. This is accomplished by providing off-hook signals to each of the terrestrial lines. The host switch will, in turn, provide return signal acknowledgement for these off-hook signals in a well-known manner. However, if address signalling is not forthcoming from the SCC, the host switch will disable the lines until the earth station outage is rectified.

In some instances, a call will be blocked because of insufficient satellite circuit capacity. What the SCC must do in this case depends upon the control signalling utilized. If it is incoming Touch-Tone or delayed dial pulse, the SCC just does nothing, and the call will time out. The host switch will thick that congestion has occurred in the network and can then attempt an alternative terrestrial route. If the incoming call is immediate dial pulse, the SCC will have no choice but to receive the address digits. Here, the originating SCC will have to supply an overflow tone to the incoming call. In times of originating SCC congestion, only the CSC traffic load is affected. Since the CSC is based on a "delay" approach in which the control signalling is sent as soon as the capacity is available rather than a "lost call" approach in which the message is dropped if no capacity is immediately available, call blocking is held to a minimum.

In the case of earth station failure at the terminating station, the originating SCC or the CRF must terminate the call, and the incoming call must be connected to a trunk overflow tone. If no terrestrial circuits are available at the terminating SCC, the terminating SCC notifies the originating or reference SCC, as the case may be, and a "no response" would be given to the directionalized call.

Conference Calls

Figure 13:
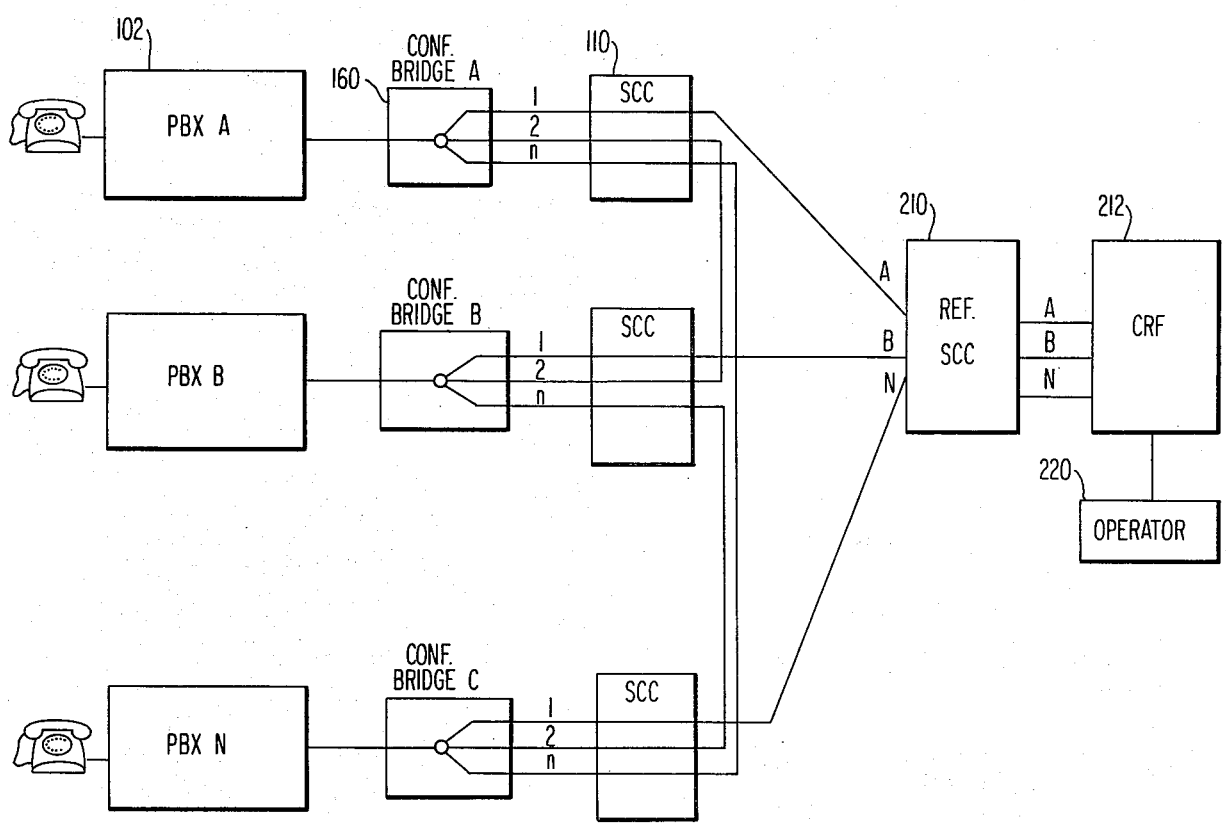
FIG. 13 is a block diagram illustrating the processing of conference calls by the OHIDA technique.

Voice conference calls may be achieved in the OHIDA system as shown in FIG. 13. Each PBX 102 is provided with a conference bridge 160 which is itself a trunk with a fixed position on the PBX and n fixed positions on the SCC. Position 1 on each conference bridge is for call supervision and is a non-directionalized access line to the CRF 212. A subscriber at PBX A seizes its conference bridge by dialing the proper access code, e.g., dialing numeral 7 or extension XXXX, etc. Assuming that the subscriber is successful in finding an idle bridge circuit, the SCC 110 sees this as an off-hook signal on a voice conference port. The SCC determines if sufficient capacity is available to process the call, and, if not, an overflow tone is connected. If the SCC can process the call, it forwards the call as a conference, non-directionalized call, and the connection A through the reference SCC 210 is established to the CRF. At this point, the conference initiator is ready to enter the addresses of the various called parties. The SCC can accommodate operator-assisted voice conference call set-ups, and this will be assumed in the following description. It should be noted, however, that other address processing or call set-up schemes could be used.

The operator 220 at the CRF 212 answers the call, and the conference initiator identifies the parties he wishes to bring into the conference along with their telephone numbers. The operator places party A on hold and initiates calls to parties B-N. The operator, upon contacting party B, identifies the purpose of the call and brings him on-line with party A. This call is initiated over circuit B from the CRF and is automatically associated with circuit A at the CRF. When the operator goes off-hook to B, the reference SCC will have joined B at conference bridge B, position 2, with A at conference bridge A, position 2. Parties A and B can begin the conference while particles C-N are brought on-line. If a party does not answer or is busy, party A is notified and the operator goes on-hook.

Throughout the duration of the conference, the call is being supervised by the CRF 212. As parties drop out of the conference, they pass this information automatically over supervisory channels A-N.

Several configurations are possible for the SCCs, depending on the requirements of the system. Some examples are illustrated in FIGS. 14-17.

Figure 14:
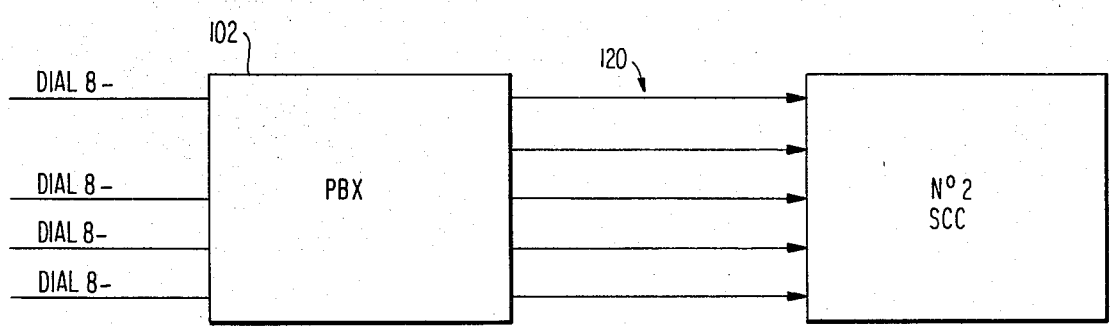
FIGS. 14-17 illustrate several PBX-SCC switch configurations which are possible in the OHIDA system.

FIG. 14 assumes a conventional step-by-step type PBX accessing the SCC. Conventional PBXs of this type do not have the capability of storing dialed digits in a register-sender but respond to each incoming digit. Thus, they are referred to as "non-senderized" switches. As a result, a customer wishing to use a company-wide, universal numbering plan of dial 8 and then a seven-digit number has no choice but to configure his PBX-SCC as illustrated. The PBX 102 cannot route on the dial number 8 since this digit only distinguishes the call as a satellite system call. Thus, if the customer does not want to modify his numbering, he must use all non-directionalized satellite access lines 120.

The customer can, however, modify his PBX to accommodate directionalized lines. The step-by-step dial system allows for the selection of an outgoing trunk after first, second or third digits and so on up to seven or more dialed digits. Therefore, if the NNX of the NNX-XXXX dialed party number identifies the called switch, a directionalized trunk can be seized at the PBX, for example, after the third digit is dialed. The remaining four digits are transmitted through the satellite over the directionalized line to the called switch.

Figure 15:
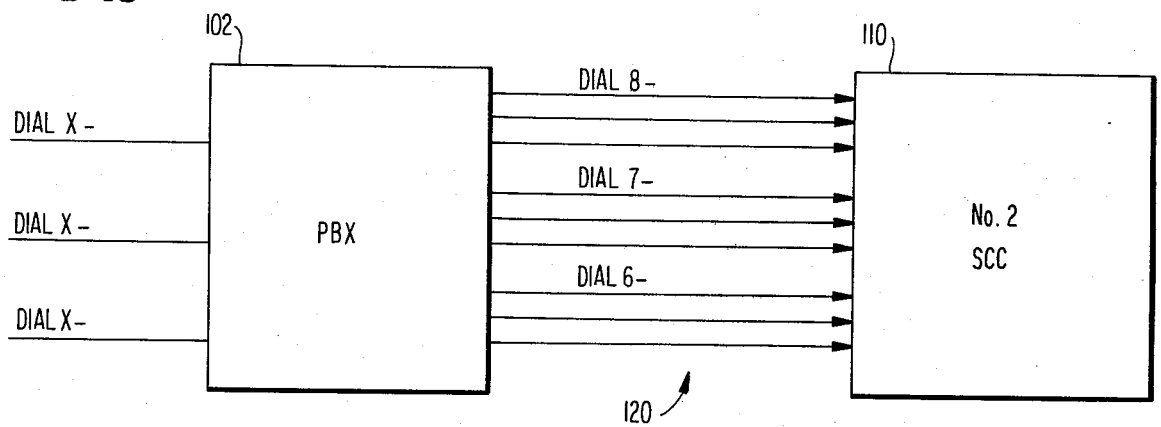

A less difficult step-by-step modification is illustrated in FIG. 15. Just as a step-by-step switch can be directed by dial 0 to an operator position, dial 9 to an outside line and dial 8 to a private line, it can also be directed by dial 7 to a directionalized trunk group to earth station A or dial 6 to the second directionalized trunk group to earth station B, etc.

Figure 16:
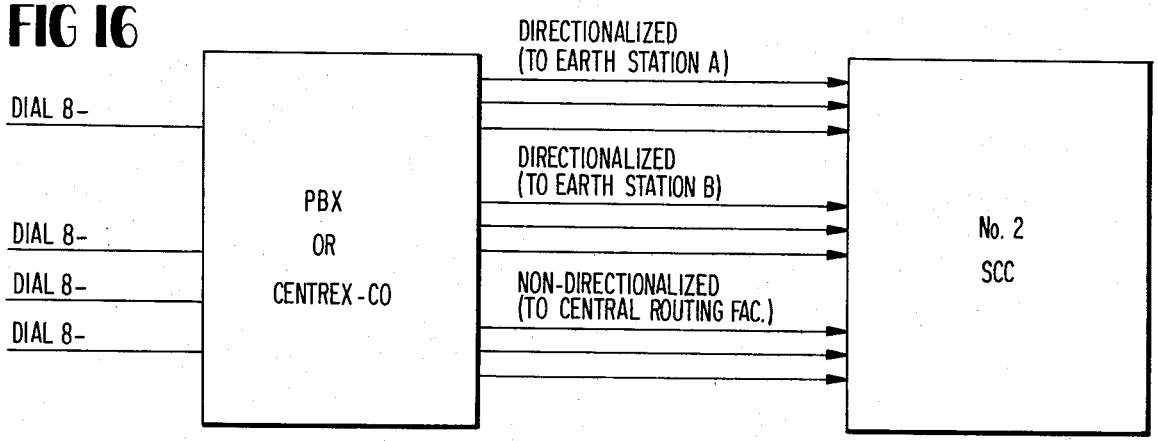

Shown in FIG. 16 is a switch configuration having a modern PBX or CENTREX-CO, both of which are well known in the telephone switching field. Both of these latter type switches are senderized, and, therefore, the digits are stored in a register, translation can be performed, a directionalized or non-directionalized access trunk can be selected, and the seven-digit party number can be forwarded.

Figure 17:
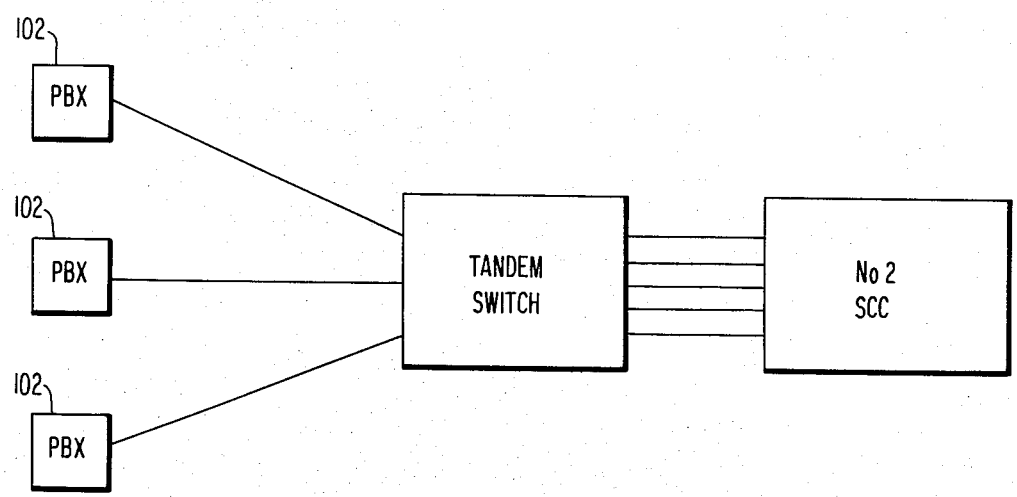

The configuration of FIG. 17 provides a tandem switching arrangement utilizing a modern PBX or CENTREX facility. PBXs 102 remote from the SCC site are connected to the host PBX with access lines. The universal dial 8-NNX-XXXX numbering plan is preserved.

While the OHIDA system has been described herein as used in a TDMA system, it should be understood that it would be easily compatible with FDMA or, indeed, any communications system in which a plurality of channels may be demand assigned. For example, it would be a simple matter to adapt the Frequency Division Multiple Access (FDMA) communications system described in U.S. Pat. No. 3,564,147 for operation by the OHIDA technique.

While the invention has been described in terms of preferred embodiments, those skilled in the art will recognize that the invention can be practiced in other and alternative embodiments. For example, OHIDA can be embodied with all telecommunication terminals directly as long as these terminals can generate a supervisory signal, be it out-of-band, in-band or over a CCIS data link. OHIDA can accommodate any trunk interface, and it is not necessary that the communications system include a satellite relay since demand assigned terrestrial trunks would benefit equally as well from the OHIDA mode of operation.

What is claimed is:

1. A method of establishing a communication link between a calling switch and a called switch through originating and terminating relay stations via selected channels from a pool of demand assigned channels between said originating and terminating relay stations, comprising the steps of:
   (a) generating, on a selected one of a plurality of originating trunks between said calling switch and an originating earth station, first supervisory signals indicative of the on-hook or off-hook state of said trunk, each of said trunks being dedicated for communications destined for a particular called switch via a particular terminating relay station;
   (b) monitoring said selected trunk to detect a first supervisory signal indicative of the off-hook state of said selected trunk;
   (c) determining at said originating relay station the particular called switch and particular terminating relay station to which said selected trunk is dedicated;
   (d) selecting an available channel from said pool of channels to connect said originating and terminating relay stations;
   (e) determining at said terminating relay station the particular called switch to which the selected channel is to be connected; and
   (f) connecting said selected channel to said calling and called switches.

2. The method according to claim 1 wherein said generating step comprises providing a tone on said selected trunk, the presence of a tone on said trunk indicating an on-hook state, and the absence of a tone indicating an off-hook state.

3. The method according to claim 2 wherein said monitoring step comprises:
   (a) detecting the presence or absence of said tone on said selected trunk by a tone detection means, said tone detection means providing first and second output signals indicative of the presence or absence, respectively, of said tone; and
   (b) monitoring the output signals from said tone detection means in order to detect a second output signal.

4. The method according to claim 1 wherein said originating relay station includes a central processor unit (CPU) having a translation table for determining the called switch to which said selected originating trunk is dedicated.

5. The method according to claim 1 wherein said selecting step comprises:
   (a) forwarding from said originating relay station to said terminating relay station a second supervisory signal indicating the selected trunk on which the off-hook signal has been detected;
   (b) returning from said terminating relay station to said originating relay station an acknowledgement signal; and
   (c) connecting said originating and terminating relay stations to said seleted channel.

6. The method according to claim 5 wherein said terminating relay station includes a central processor unit (CPU) having a translation table for determining, on the basis of said second supervisory signal, the particular called switch to which the selected channel is to be connected.

7. The method according to claim 5 wherein said supervisory and acknowledgement signals are forwarded and returned, respectively, over a designated out-of-band signalling channel.

8. A method for establishing a communications link between calling and called telephone subscribers connected to calling and called switches, respectively, comprising:
   (a) transmitting from said calling subscriber to said calling switch an address signal identifying the called subscriber and called switch;
   (b) generating at said calling switch an off-hook signal on a selected trunk dedicated to said called switch;
   (c) establishing a communications link between said calling and called switches according to the method of claim 1;
   (d) transmitting from said calling switch to said called switch the address of said called subscriber; and
   (e) connecting said called subscriber to said selected channel at said called switch.

9. The method according to claim 1 wherein said called switch is connected to said terminating relay station by a plurality of terminating trunks, said method further comprising the steps of:

(a) monitoring said originating and terminating trunks to detect supervisory signals indicative of the on-hook state of said calling and called switches, respectively;
(b) forwarding to said originating or terminating relay stations a second supervisory signal indicative of the terminating or originating trunk, respectively, on which the on-hook supervisory signal has been detected; and
(c) disconnecting said selected channel from said originating and terminating trunks.

10. The method according to claim 1 further comprising the steps of:
(a) sending a signalling message from said calling to said called switch, said signalling message indicating the address of a second called switch;
(b) selecting a channel from said called switch to said second called switch in order to form a calling switch-to-called switch-to-second called switch communications link; and
(c) disconnecting said called switch in order to form a calling switch-to-second called switch communications link.

11. The method according to claim 10 wherein said called switch is connected to said terminating relay station by a plurality of terminating trunks, said method further comprising the steps of:
(a) monitoring said originating and terminating trunks to detect supervisory signal indicative of the on-hook states of said calling and second called switches, respectively;
(b) forwarding to said originating or terminating relay stations a second supervisory signal indicative of the terminating or originating trunk, respectively, on which the on-hook supervisory signal has been detected; and
(c) disconnecting said selected channel from said originating and terminating trunks.

* * * * *

UNITED STATES PATENT AND TRADEMARK OFFICE
CERTIFICATE OF CORRECTION

PATENT NO. : 4,220,821

DATED : September 2, 1980

INVENTOR(S) : Jerome G. Lucas

It is certified that error appears in the above-identified patent and that said Letters Patent are hereby corrected as shown below:

IN THE ABSTRACT

Line 8 - After "trunk" delete "of" insert --or--

Column 2, line 35 - delete "fastener" insert --faster--

Column 3, line 30 - delete "illustrative" insert --illustrate-- line 33 - delete "FIG." insert --FIGS--

Column 11, line 35 - delete "CRF 121" insert --CRF 212--

Column 13, line 48 - delete "thick" insert --think--

Column 14, line 38 - delete "particles" insert --parties--

UNITED STATES PATENT AND TRADEMARK OFFICE
CERTIFICATE OF CORRECTION

PATENT NO. : 4,220,821

DATED : September 2, 1980

INVENTOR(S) : Jerome G. Lucas

It is certified that error appears in the above-identified patent and that said Letters Patent are hereby corrected as shown below:

IN THE CLAIMS

Column 16, line 48 - after "method" delete "for" insert --of--

Column 17, line 3 - delete "state" insert --states--

Column 18, line 11 - delete "signal" insert --signals--

Signed and Sealed this

Thirtieth Day of December 1980

[SEAL]

Attest:

SIDNEY A. DIAMOND

Attesting Officer

Commissioner of Patents and Trademarks